(12) United States Patent
Higuchi

(10) Patent No.: US 6,501,921 B2
(45) Date of Patent: Dec. 31, 2002

(54) HIGH VOLTAGE GENERATING CIRCUIT FOR A TONER SYSTEM PRINTER

(75) Inventor: Yoshio Higuchi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/962,636

(22) Filed: Sep. 25, 2001

(65) Prior Publication Data

US 2002/0044790 A1 Apr. 18, 2002

(30) Foreign Application Priority Data

Oct. 12, 2000 (JP) ........................... 2000-007322

(51) Int. Cl.[7] .................. G03G 15/00; H02M 3/335
(52) U.S. Cl. .................. 399/88; 363/21.01; 399/89
(58) Field of Search .................. 399/75, 88, 89, 399/90; 363/16, 20, 21.01, 95, 97, 131

(56) References Cited

U.S. PATENT DOCUMENTS

| 3,996,506 A | * | 12/1976 | Kichak | 363/49 |
| 4,013,938 A | * | 3/1977 | McCoy | 363/56.01 |
| 4,387,418 A | * | 6/1983 | Koike | 363/19 |
| 5,898,578 A | * | 4/1999 | Tamura et al. | 363/19 |

FOREIGN PATENT DOCUMENTS

| JP | 60-245470 | 12/1985 |
| JP | 5-64443 | 3/1993 |
| JP | 9-191644 | 7/1997 |
| JP | 11-146646 | 5/1999 |

OTHER PUBLICATIONS

Concise Statement of Relevancy Between The Invention and Materials (2 pages).

* cited by examiner

Primary Examiner—Hoan Tran
(74) Attorney, Agent, or Firm—Rosenthal & Osha L.L.P.

(57) ABSTRACT

In a structure including a voltage control circuit 1 for changing a voltage control signal 14 to control an oscillation amplitude of a transistor Q1 for oscillation, thereby stabilizing a voltage of a secondary output 13, there are provided a load suppressing circuit 5 for restricting a lower limit of a load impedance of a secondary coil L2 to prevent the oscillation of the transistor Q1 for oscillation from being stopped when the secondary output 13 is short-circuited, and an intermittent control circuit 2 for repeating an operation for reducing a voltage of the voltage control signal 14 to stop the oscillation when detecting a short circuit of a load and for raising the voltage of the voltage control signal 14 to restart the oscillation after stopping the oscillation.

5 Claims, 8 Drawing Sheets

HIGH VOLTAGE GENERATING CIRCUIT FOR A TONER SYSTEM PRINTER

BACKGROUND OF THE INVENTION

1. Field of the Invention

The present invention relates to a toner system printer for carrying out printing by using a toner such as a laser system printer or a copying machine, and more particularly to a high voltage generating circuit for generating a high voltage to be required for toner system printing.

2. Description of the Related Art

JP-A-63-87173 has disclosed the conventional art in which a switching operation is changed into an intermittent operation to prevent the breakdown of an oscillating element when an output is short-circuited in a switching power source. In this technique, a resistor for detecting a current is inserted in a current path of an emitter of a switching transistor. When a voltage of the emitter exceeds a predetermined voltage, a current of the switching transistor is controlled to be a constant current. Moreover, a comparator for detecting that a load is short-circuited is provided. When a short circuit is caused, the switching operation of the switching transistor is stopped by the comparator. Furthermore, when a charging period of a capacitor for soft start is passed after the switching operation is stopped, the switching is restarted. In other words, when the load is short-circuited, the switching transistor carries out intermittent oscillation. Therefore, the switching transistor is prevented from being broken when the load is short-circuited (which is a first conventional art).

Moreover, JP-A-9-9616 has disclosed a technique. In this technique, when the short circuit of an output is detected, constant current charging for a capacitor is started. When a terminal voltage of the capacitor exceeds a first voltage, an internal bias source is turned OFF, thereby stopping the driving operation of a switching transistor. Then, when the terminal voltage of the capacitor is raised to be a second voltage which is higher than the first voltage, the capacitor is discharged to have an initial voltage, thereby restarting the driving operation of the switching transistor. In other words, when a load is short-circuited, the switching transistor is intermittently driven. Therefore, it is possible to prevent the switching transistor from being broken when the load is short-circuited (which is a second conventional art).

In a method in which a switching element is brought into a saturation state when it is turned ON as in the switching method according to the technique described above, large output power can cause efficient conversion to be carried out. However, in the case in which slight output power is enough as in a high voltage generating circuit for a toner system printer, a conversion efficiency is deteriorated and an unstable operation is caused. For this reason, the high voltage generating circuit for a toner system printer employs such a structure that a transistor for oscillation which is connected to a primary coil is always carries out self-oscillation in a non-saturation region and an amplitude of oscillation is controlled to stabilize an output voltage. In other words, there has been employed a structure in which an output voltage is stabilized by a method different from the first conventional art and the second conventional art.

FIG. 7 shows the structure described above, that is, a conventional art of a high voltage generating circuit for stabilizing an output voltage by controlling an amplitude of oscillation of a transistor for oscillation. More specifically, a transistor for oscillation Q1 (which will be hereinafter referred to as a transistor Q1) has a collector connected to a primary coil L1 and a base connected to one of terminals of an auxiliary coil L3. Moreover, an output of an OP amplifier 3 for generating a voltage control signal based on a voltage of a secondary output is led to the other terminal of the auxiliary coil L3. For this reason, the transistor Q1 increases an amplitude of oscillation when a voltage of the voltage control signal sent from the OP amplifier 3 is raised, and reduces the amplitude of the oscillation when the voltage of the voltage control signal is dropped. On the other hand, the OP amplifier 3 reduces the voltage of the voltage control signal when the voltage of the secondary output is raised to be higher than a set value, and raises the voltage of the voltage control signal when the voltage of the secondary output is reduced to be lower than the set value. Therefore, the voltage of the secondary output is stabilized to be a voltage set based on a voltage setting signal 22 (the reference numeral 21 denotes a path for applying a reference voltage to set an operating point of the OP amplifier 3).

In the structure described above, that is, such a structure that the voltage of the secondary output is stabilized by controlling the amplitude of the oscillation, the transistor Q1 stops the oscillation even if the oscillation is not externally stopped in respect of the relationship in which a load is too increased if an output is short-circuited. On the otherhand, in the case in which the oscillation of the transistor Q1 is stopped, the voltage of the output (voltage control signal) of the OP amplifier 3 is raised so that a base current of the transistor Q1 is increased. Therefore, a collector current is increased. More specifically, when the transistor Q1 is brought into an oscillation stop state, a calorific value becomes greater than that in the oscillation state so that an element is broken more easily. For this reason, the methods according to the first and second conventional arts (the structure in which a switching element is brought into a saturation state during turn—on) cannot be used as a method for carrying out protection when an output is short-circuited. Therefore, another method is used to protect the transistor Q1.

More specifically, when the output is short-circuited, the voltage of the voltage control signal sent from the OP amplifier 3 is raised. Therefore, there has been employed such a structure that a resistor R21 is inserted between the output terminal of the OP amplifier 3 and the other terminal of the auxiliary coil L3 and a clamp circuit comprising diodes D5 and D6 is connected between the resistor R21 and the auxiliary coil L3. Accordingly, the voltage of the other terminal of the auxiliary coil L3 is controlled to be approximately 1.3 V also when the output voltage of the OP amplifier 3 is raised. As a result, an increase in the base current of the transistor Q1 is restricted and an increase in the collector current is suppressed. Consequently, the transistor Q1 can be protected from breakdown (which is a third conventional art).

Moreover, FIG. 8 shows a structure in which a different method from the third conventional art is employed for protecting the transistor Q1. More specifically, a portion comprising the resistor R21 and the diodes D5 and D6 in FIG. 7 is replaced by a resistor R22 and a Zener diode D7 (other portions are identical to those of the structure shown in FIG. 7). In such a structure, accordingly, the voltage of the other terminal of the auxiliary coil L3 is shifted to the lower side by a Zener voltage of the Zener diode D7 with respect to the output voltage of the OP amplifier 3. Therefore, the voltage of the other terminal of the auxiliary coil L3 is controlled to be low also when the output voltage of the OP amplifier 3 is raised. As a result, an increase in the base current of the transistor Q1 is restricted and an increase in the collector current is limited. Consequently, the transistor Q1 can be protected from breakdown (which is a fourth conventional art).

For the secondary output, moreover, there has been proposed a structure in which a resistor R31 is inserted in a current path of a secondary output as shown in FIG. 9A. Alternatively, there has been proposed a structure in which a resistor R32 is inserted in the ground level side to detect a current value of the secondary output as shown in FIG. 9B. Moreover, there has been proposed a structure in which both a resistor R33 and a resistor R34 are inserted as shown in FIG. 9C.

However, the resistors R31 and R33 shown in FIGS. 9A and 9C are elements for controlling a maximum value of a discharge current of a capacitor C4 when a secondary output is short-circuited, there by preventing the capacitor C4 from being deteriorated. Moreover, the resistors R32 and R34 are elements for detecting the current oft the secondary output. Accordingly, the values of the resistors R31 to R34 are set to be comparatively small. As a result, when the secondary output is short-circuited, the load of the secondary coil L2 is too increased so that the oscillation of the transistor Q1 is stopped. When the oscillation is stopped, the collector current of the transistor Q1 is increased even if the third conventional art or the fourth conventional art is used. At this time, it is hard to reduce an increase in the current of the collector. For this reason, when the output is short-circuited, the calorific value of the transistor Q1 is increased. Accordingly, it is necessary to attach a radiator to the transistor Q1 or to set the transistor Q1 to be a large-sized element having a great allowable heat loss in order to prevent the thermal breakdown of the transistor Q1 during the short circuit of the output. Consequently, the cost of parts is increased.

Furthermore, also in the case in which the radiator is attached to the transistor Q1 or the transistor Q1 is set to be a large-sized element having a great allowable heat loss, the following problem arises. More specifically, it is dangerous to increase the length of a path for a high voltage sent from a high voltage generating circuit. Therefore, the high voltage generating circuit is provided in the vicinity of a toner system printing section having a photosensitive drum. Accordingly, when the secondary output is short-circuited so that the calorific value of the high voltage generating circuit is increased, an environmental temperature of the toner system printing section is raised. For this reason, the temperature of rollers of the photosensitive drum is raised so that the performance of the rollers is deteriorated. As a result, it is hard to uniformly charge the surfaces of the rollers. Consequently, printing performance is deteriorated.

SUMMARY OF THE INVENTION

The invention has been made to solve the problems and has an object to provide a high voltage generating circuit for a toner system printer which can restrict a lower limit of a load impedance of a secondary coil to prevent the oscillation of a transistor for oscillation from being stopped during a short circuit of a secondary output and can carry out intermittent oscillation to suppress an increase in the heat generation of the transistor for oscillation during the short circuit of the output, thereby preventing the performance of a toner system printing section from being deteriorated due to a rise in a temperature.

Another object of the invention is to provide a high voltage generating circuit for a toner system printer which can suppress an increase in the number of elements also during intermittent oscillation by using a circuit for restricting a lower limit of a load impedance as a circuit for detecting a short circuit of an output.

Still another object of the invention is to provide a high voltage generating circuit for a toner system printer which can suppress an increase in the number of elements also during intermittent oscillation by using a capacitor for changing a PWM signal into a direct current as a capacitor for delaying the restart of oscillation in the intermittent oscillation.

Yet still another object of the invention is to provide a high voltage generating circuit for a toner system printer which can optionally delay a period required for restarting the oscillation in the intermittent oscillation without causing an increase in a time constant of a circuit for changing a PWM signal into a direct current.

Yet still another object of the invention is to provide a high voltage generating circuit for a toner system printer which can cause the oscillation in the intermittent oscillation to sharply rise without an increase in the number of elements.

In order to solve the problem, the present invention provides a high voltage generating circuit for a toner system printer comprising a transformer having at least a primary coil, a secondary coil and an auxiliary coil wound thereon, a transistor for oscillation having a collector connected to the primary coil and a base connected to a first terminal of the auxiliary coil and serving to carry out self-oscillation, and a voltage control circuit for sending, to a second terminal of the auxiliary coil, a voltage control signal generated based on a voltage detection signal indicative of a voltage of a secondary output, wherein the voltage control circuit stabilizes the voltage of the secondary output by controlling an oscillation amplitude of the transistor for oscillation in response to the voltage control signal, and the secondary output is led to a high voltage applying portion of a toner system printing section, the high voltage generating circuit further comprising a load suppressing circuit inserted in a current path of the secondary coil and serving to restrict a lower limit of a load impedance of the secondary coil, thereby preventing the oscillation of the transistor for oscillation from being stopped when the secondary output is short-circuited, and an intermittent control circuit for repeating an operation for reducing a voltage of the voltage control signal to stop the oscillation of the transistor for oscillation when detecting a short circuit of a load, and for raising the voltage of the voltage control signal to restart the oscillation of the transistor for oscillation after stopping the oscillation of the transistor for oscillation.

More specifically, the load suppressing circuit prevents the transistor for oscillation from stopping the oscillation also when the secondary output is short-circuited. Accordingly, also in the case in which the secondary output is short-circuited, the transistor for oscillation carries out the oscillation when the intermittent control circuit is to raise the voltage of the voltage control signal. Moreover, when the intermittent control circuit is to reduce the voltage of the voltage control signal, the transistor for oscillation stops the oscillation. Consequently, also when the secondary output is short-circuited, the transistor for oscillation carries out the intermittent oscillation. Therefore, the heat generation of the transistor for oscillation can be suppressed.

In addition to the structure described above, moreover, the load suppressing circuit is a voltage dividing circuit inserted between a ground level side path of a rectifying and smoothing circuit for generating the secondary output having a negative voltage by rectifying and smoothing an output of the secondary coil and a ground level, and the intermittent control circuit detects the short circuit of the secondary output based on a divided voltage sent from the voltage dividing circuit.

More specifically, the load suppressing circuit also serves as a circuit for detecting the short circuit of the secondary output. Therefore, it is not necessary to separately provide a circuit for detecting the short circuit of the secondary output.

In addition to the structure described above, furthermore, there is provided a filter circuit including a resistor for a filter which has one of terminals connected to a signal source of a PWM signal and a capacitor for a filter which is connected between the other terminal of the resistor for a filter and the ground level and serving to change the PWM signal into a direct current, the voltage control circuit changing a level of the voltage control signal based on a voltage setting signal to be an output of the filter circuit and the voltage detection signal, thereby stabilizing the voltage of the secondary output into a voltage corresponding to the voltage setting signal, wherein the intermittent control circuit is a switch circuit for closing a connection between the output of the filter circuit and the ground level when detecting the short circuit of the secondary output, and a rise in a voltage of the output of the filter circuit which is caused when the connection of the switch circuit is opened is delayed by the capacitor for a filter, thereby delaying the restart of the oscillation in the intermittent oscillation.

More specifically, the capacitor for a filter serves as an element for delaying the restart of intermittence in the intermittent oscillation and an element to be the filter for changing a PWM signal into a direct current.

In addition to the structure described above, moreover, the intermittent control circuit includes a diode having an anode connected to the output of the filter circuit and a cathode connected to the switch circuit, and a capacitor for delay which is connected to the cathode of the diode, wherein the capacitor for delay is discharged when the connection of the switch circuit is closed.

More specifically, when the connection of the switch circuit is changed from a closed state to an open state, the capacitor for delay which is set in a discharge state is connected through the diode in parallel with the output of the filter circuit. Moreover, in the case in which the capacitor for delay is not set in the discharge state, the capacitor for delay is separated from the output of the filter circuit by the diode.

In addition to the structure described above, furthermore, the capacitor for delay is connected between an output point for a divided voltage of the voltage dividing circuit and the cathode of the diode.

More specifically, when the voltage between the terminals of the capacitor for delay is raised so that the oscillation is restarted and the divided voltage is raised, the voltage of the terminal on the diode side in the capacitor for delay is raised. Accordingly, the capacitor for delay is separated from the filter circuit through the diode. Consequently, the rise in the output voltage of the filter circuit is only delayed by the capacitor for a filter. Therefore, when the oscillation is restarted, the output voltage of the filter circuit is rapidly raised.

DETAILED DESCRIPTION OF THE PREFERRED EMBODIMENTS

An embodiment of the invention will be described below with reference to the drawings.

Figure 1:
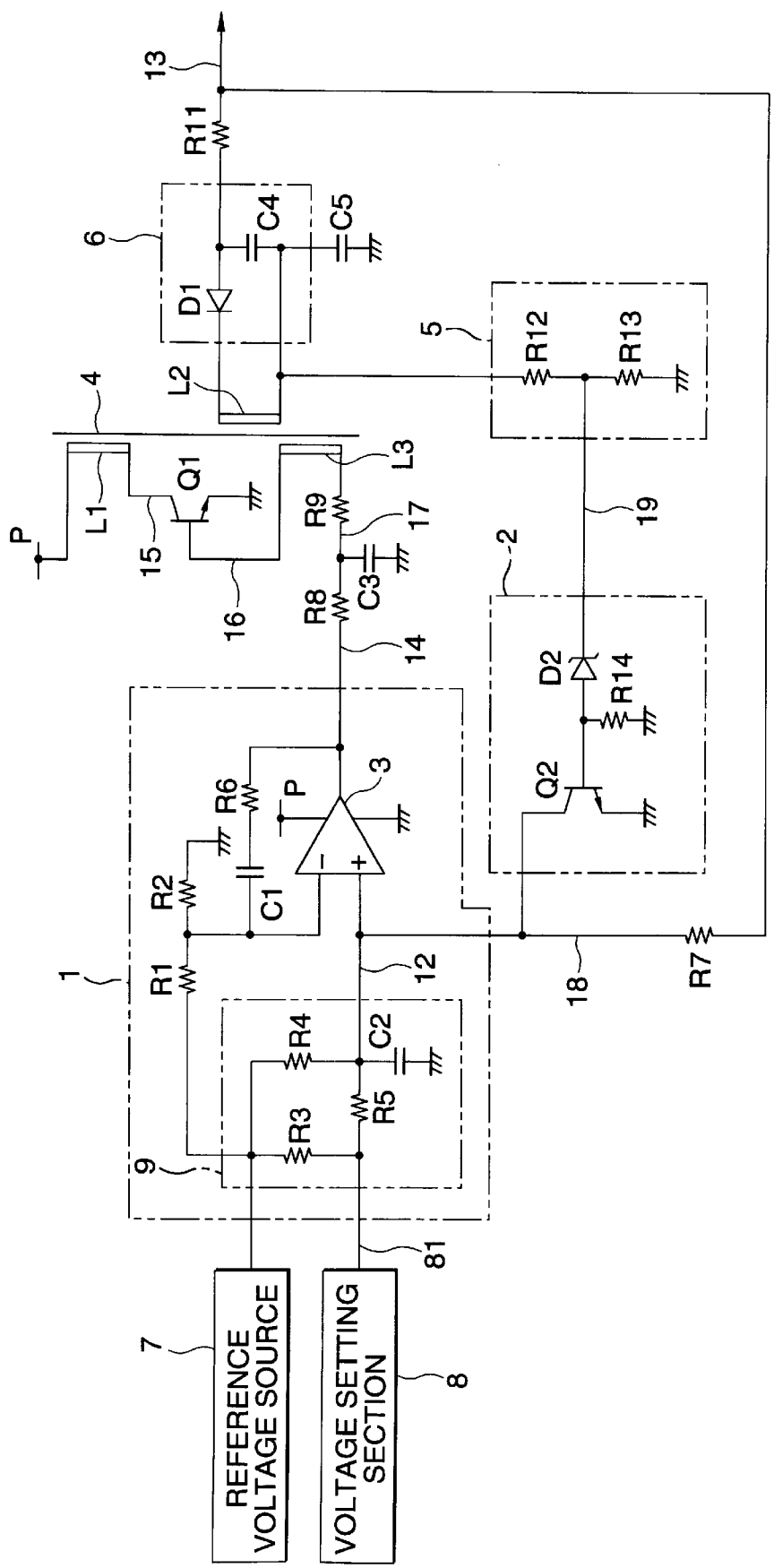
FIG. 1 is a circuit diagram showing an electrical connection according to a first embodiment of a high voltage generating circuit of a toner system printer in accordance with the invention.

FIG. 1 is a circuit diagram showing an electrical connection according to a first embodiment of a high voltage generating circuit for a toner system printer in accordance with the invention, illustrating a structure in which an output voltage can be varied with a voltage of approximately −1100 V, for example.

In FIG. 1, a reference voltage source 7 is a block for outputting a voltage precisely stabilized to 10 V, for example. Moreover, a voltage setting section 8 is a block for setting a voltage of a secondary output 13 and serves to set the voltage of the secondary output 13 with a duty ratio of a PWM signal to be output. The output of the voltage setting section 8 is an open drain output.

A voltage control circuit 1 is a block for sending, to the other terminal of an auxiliary coil L3, a DC voltage control signal 14 generated based on a voltage detection signal 18 indicative of the voltage of the secondary output 13. Then, a voltage of the voltage control signal 14 is changed to control an oscillation amplitude of a transistor Q1. Consequently, the voltage of the secondary output 13 is stabilized into a voltage set by the voltage setting section 8.

An output of the voltage control circuit 1 (an output terminal of an OP amplifier 3) is led to a second terminal of the auxiliary coil L3 through a resistor R8 for limiting a base current of the transistor Q1 and a resistor R9 for limiting a minimum value of a load impedance of the auxiliary coil L3. Moreover, a node of the resistor R8 and the resistor R9 is grounded through a capacitor C3.

A transformer 4 has a primary coil L1, a secondary coil L2 and the auxiliary coil L3 wound thereon, and one of terminals of the primary coil L1 is connected to a positive power source Pof 20 V, for example. Moreover, the transistor for oscillation Q1 having a collector connected to the other terminal of the primary coil L1, a base connected to a first terminal of the auxiliary coil L3 and an emitter grounded (which will be hereinafter referred to as the transistor Q1) is an element for carrying out self-oscillation by using, as a feedback path, magnetic coupling formed between the primary coil L1 and the auxiliary coil L3. At this time, the transistor Q1 is operated in a non-saturation region.

A diode D1 and a capacitor C4 form a rectifying and smoothing circuit 6 for rectifying and smoothing a high voltage generated on the secondary coil L2, and the secondary output 13 having a negative level which is a rectifying and smoothing output is led to a high voltage applying portion of the toner system printing section (which will be described later in detail). A resistor R11 connected between an output of the rectifying and smoothing circuit 6 and the secondary output 13 is an element for controlling a maximum value of a discharge current of the capacitor C4 when the secondary output 13 is short-circuited.

A load suppressing circuit 5 is a block for restricting a lower limit of a load impedance of the secondary coil L2, thereby preventing the oscillation of the transistor Q1 from being stopped when the secondary output 13 is short-circuited. For this reason, the load suppressing circuit 5 is inserted between a ground level side path of the rectifying and smoothing circuit 6 and the ground level (a current path of the secondary coil L2).

An intermittent control circuit 2 is a block for repeating an operation for reducing the voltage of the voltage control signal 14 to stop the oscillation of the transistor Q1 when detecting the short-circuit of the secondary output 13 based on a divided voltage 19 and for raising the voltage of the voltage control signal 14 to restart the oscillation of the transistor Q1 after stopping the oscillation of the transistor Q1.

Figure 3:
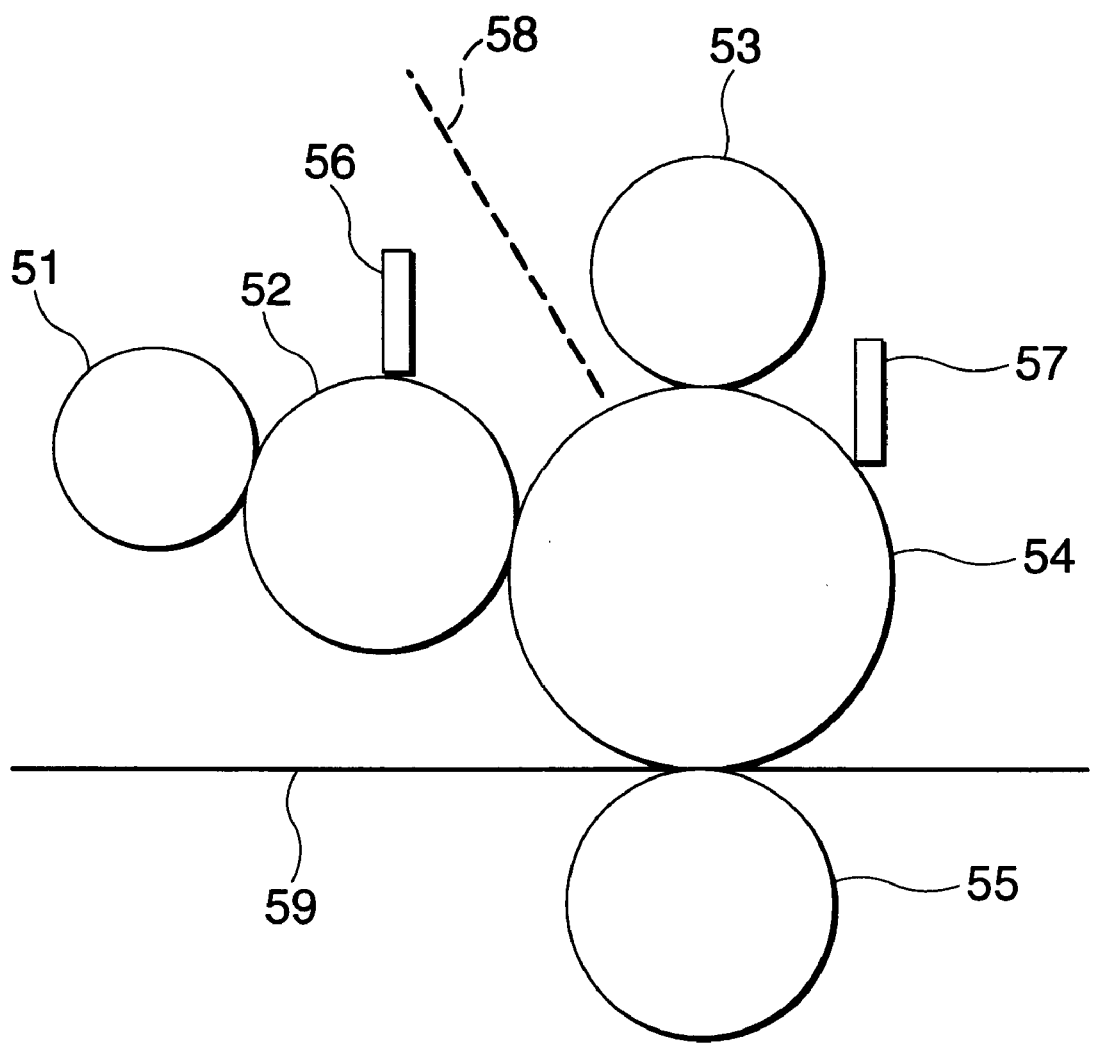
FIG. 3 is a diagram schematically illustrating a toner system printing section.

FIG. 3 is a diagram schematically illustrating the toner system printing section.

The toner system printing section is constituted by a toner roller 51, a developing roller 52, a charging roller 53, a photosensitive drum 54, a transfer roller 55, a doctor blade 56 and a cleaner blade 57. In the first embodiment, moreover, the toner system printing section is a device for applying a high voltage to a high voltage applying portion (the rollers 51 to 53 and 55, the blades 56 and 57 or the photosensitive drum 54 in the toner system printing section). In an actual machine, therefore, plural kinds of voltages are generated. In FIG. 1, a structure for generating a secondary output of a voltage different from the secondary output 13 is not shown (the reference numeral 58 denotes a laser beam and the reference numeral 59 denotes a print paper).

The detailed structures of the voltage control circuit 1, the intermittent control circuit 2 and the load suppressing circuit 5 will be described below.

The resistor R3 in the voltage control circuit 1 has one of terminals connected to the output of the reference voltage source 7 and the other terminal connected to the output of the voltage setting section 8. More specifically, the resistor R3 is an element for pulling up an output 81 of the voltage setting section 8 to the voltage of the reference voltage source 7 when the output of the voltage setting section 8 is turned OFF.

One of terminals of a resistor R4 is connected to the reference voltage source 7. Moreover, one of terminals of a resistor R5 for a filter (which will be hereinafter referred to as a resistor R5) is connected to the output of the voltage setting section 8. The other terminal of the resistor R4 and that of the resistor R5 are connected to each other and are connected to a non-inverted input of the OP amplifier 3. Moreover, a capacitor C2 for a filter (which will be hereinafter referred to as a capacitor C2) is connected between the other terminal of the resistor R5 and a ground level in order to change a signal appearing on the other terminal of the resistor R5 into a direct current.

From the foregoing, in the case in which the resistor R4 is disregarded, a voltage of the other terminal of the resistor R5 is changed from 0 V to 10 V when a duty ratio of the PWM signal 81 sent from the voltage setting section 8 is changed from 0% to 100%. On the other hand, a value of the resistor R4 is set to be approximately 1.5 times as great as that of the resistor R5. Consequently, if a resistor R7 is not provided, the voltage of the output (indicated as 12) of the other terminal of the resistor R5 is changed from approximately 4 V to 10 V with a variation in the duty ratio of the PWM signal 81 from 0% to 100%.

In other words, a block 9 comprising the resistors R3 to R5 and the capacitor C2 constitutes a filter circuit for changing the PWM signal sent from the voltage setting section 8 into a direct current.

The resistors R1 and R2 are elements for dividing the voltage of the reference voltage source 7 into 1/2 and for sending the divided voltage to an inverted input of the OP amplifier 3. Moreover, a series circuit including the capacitor C1 and the resistor R6 and connected between the inverted input and an output terminal in the OP amplifier 3 serves to prevent the parasitic oscillation of the OP amplifier 3. Furthermore, the resistors R7 connected between the secondary output 13 and the non-inverted input is an element for dividing the voltage of the secondary output 13 with an extremely high ratio and for giving the divided output as a voltage detection signal 18 to the non-inverted input.

Moreover, the OP amplifier 3 serves to operate with a single power source. For this reason, a positive power source P of 20 V is connected to a positive power terminal and a negative power terminal is grounded.

In more detail, the load suppressing circuit 5 is constituted by two resistors R12 and R13 connected in series. Therefore, the load suppressing circuit 5 functions to serve as a current detecting circuit for the secondary output 13, and divides a voltage generated between the ground level side path of the rectifying and smoothing circuit 6 and the ground level and sends a divided voltage 19 to the intermittent control circuit 2.

A Zener diode D2 in the intermittent control circuit 2 has a cathode connected to an output point for the divided voltage of the load suppressing circuit 5, and an anode connected to a base of a transistor Q2. Moreover, a collector of the transistor Q2 is connected to the non-inverted input of the OP amplifier 3 and an emitter grounded. Furthermore, a resistor R14 is connected between the base of the transistor Q2 and the ground level.

Moreover, a Zener voltage of the Zener diode D2 is higher than the divided voltage 19 obtained when a current value of the secondary output 13 is a specific value or less. Accordingly, the transistor Q2 is always set in an OFF state during a normal operation. On the other hand, when the secondary output 13 is short-circuited so that the divided voltage 19 is raised and a current flows to the Zener diode D2, the transistor Q2 is turned ON so that the connection between an output 12 of a filter circuit 9 and the ground level is closed.

Figure 4:
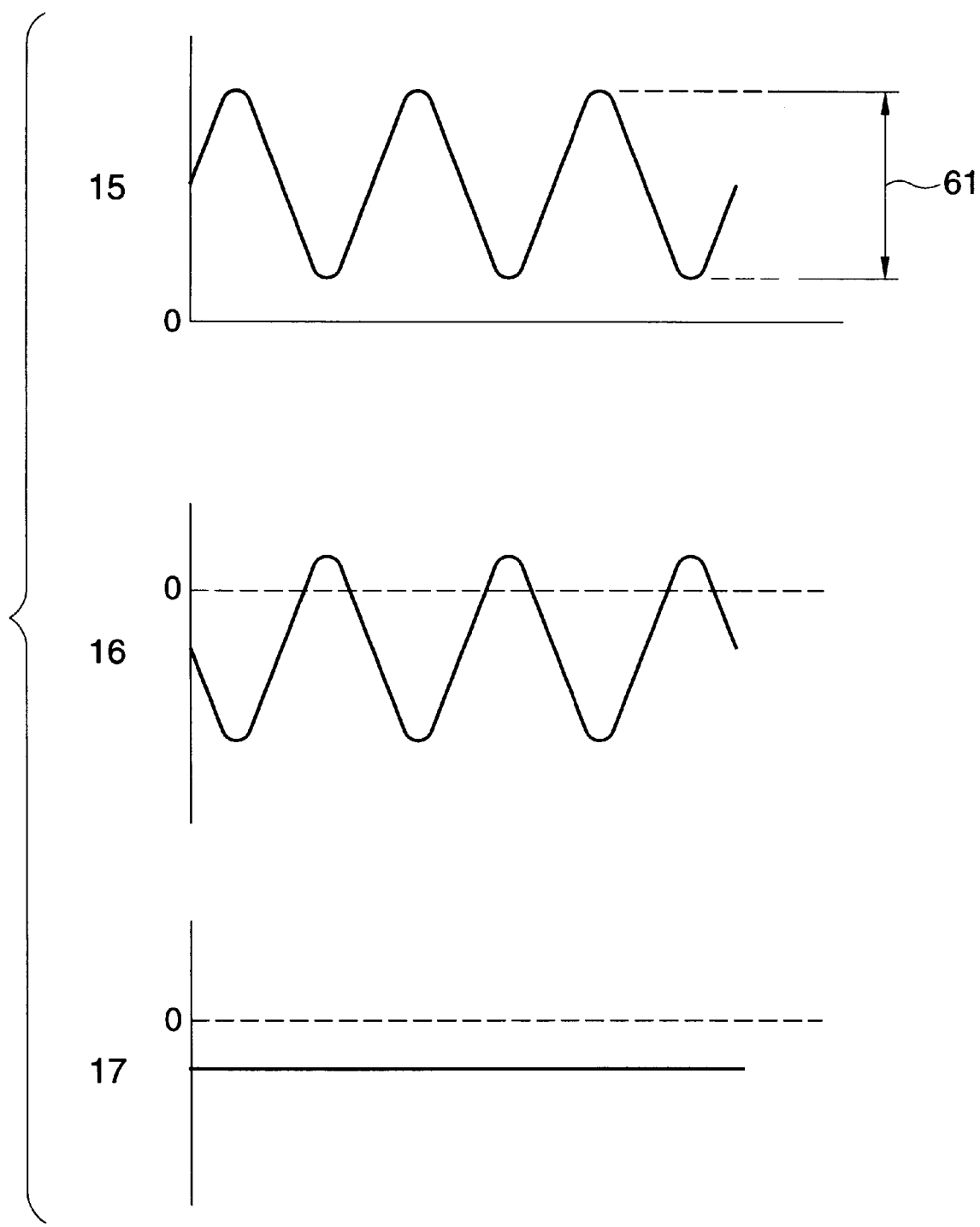
FIG. 4 is a diagram illustrating a signal waveform of a main point which is obtained during a non-short circuit of a secondary output.

In the first embodiment, the structure described above is employed. Accordingly, in the case in which the secondary output 13 is not short-circuited, the transistor Q1 carries out self-oscillation in a non-saturation region. Therefore, a voltage waveform of the collector is changed for a sine wave as indicated by 15 in FIG. 4. Moreover, a voltage generated on a first terminal of the auxiliary coil L3 also has a change close to the sine wave as indicated by 16. A level of a node of the resistors R8 and R9 is negative as indicated by 17 based on the relationship in which the first terminal of the auxiliary coil L3 is grounded through a diode between the base and emitter of the transistor Q1. Moreover, when the level of the output 14 of the OP amplifier 3 is changed, an amplitude (oscillation amplitude) 61 of the collector of the transistor Q1 is varied. Consequently, the voltage of the secondary output 13 is changed.

From the foregoing, when the voltage of the secondary output 13 is reduced, the level of the voltage detection signal 18 is shifted to the 0 V side and the level of the non-inverted input is raised. Consequently, the output level of the OP amplifier 3 is raised. When the output level of the OP amplifier 3 is raised, the oscillation amplitude of the transistor Q1 is increased so that the voltage of the secondary output 13 is raised (increased in a negative direction). For this reason, the level of the non-inverted input of the OP amplifier 3 is reduced so that the increase in the output level of the OP amplifier 3 is stopped. As a result, the voltage of the secondary output 13 is stabilized into a voltage indicated by the duty ratio (the voltage of the output 12) of the PWM signal 81 sent from the voltage setting section 8.

Figure 5:
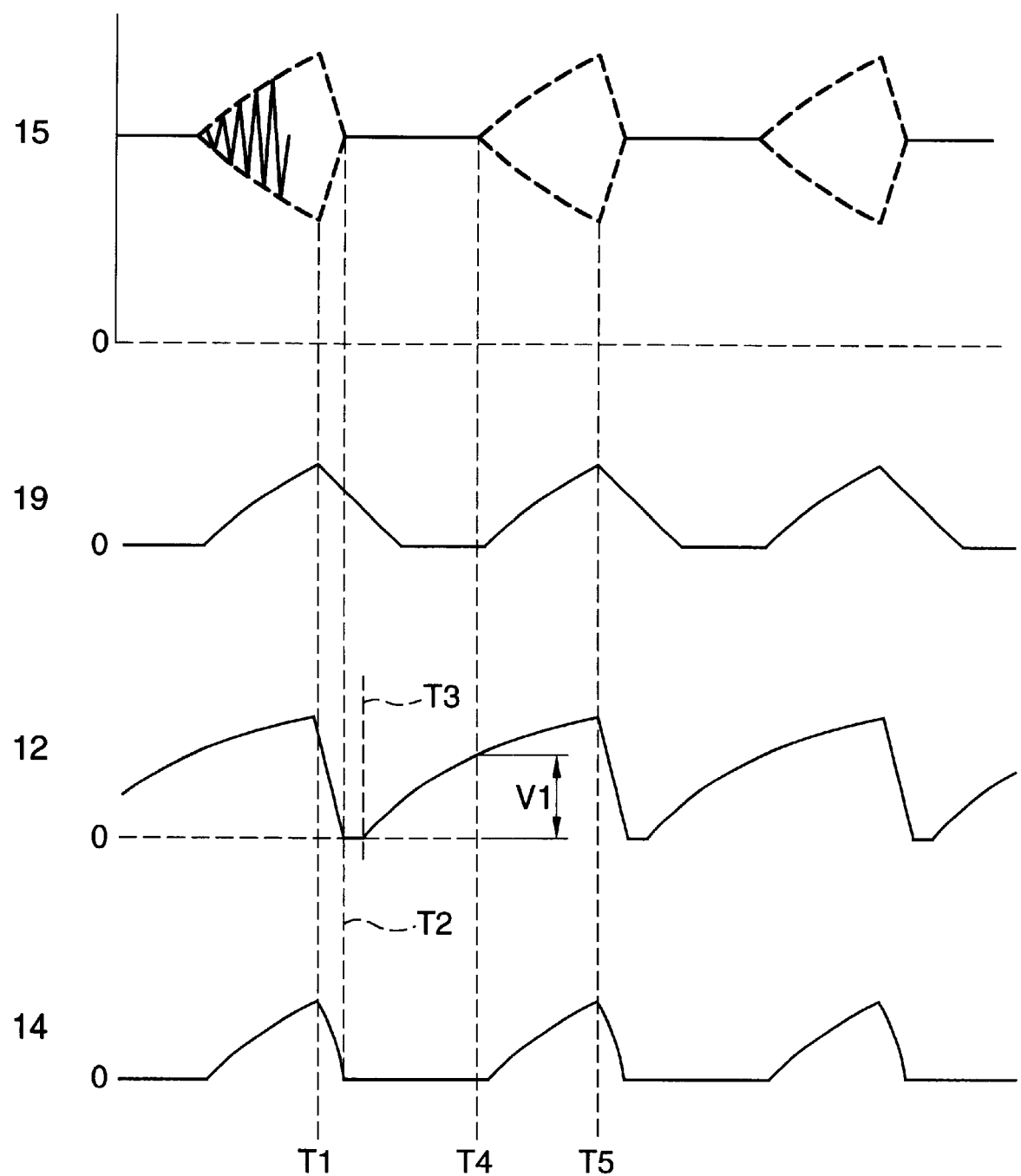
FIG. 5 is a diagram illustrating a waveform of a main signal which is obtained during a short circuit of an output according to the first embodiment.

FIG. 5 is a diagram illustrating a waveform of a main signal which is obtained during intermittent oscillation. The intermitting operation will be described with reference to FIG. 5 if necessary.

In a state in which the secondary output 13 is short-circuited, when the oscillation amplitude (indicated by 15) of the transistor Q1 is increased and the divided voltage 19 reaches a predetermined voltage (time T1), a current flows to the Zener diode D2 so that the transistor Q2 is turned ON. As a result, the voltage of the non-inverted input of the OP amplifier 3 (voltage of 12) is rapidly reduced (time T2). Accordingly, the voltage of the voltage control signal 14 to be the output of the OP amplifier 3 is rapidly reduced. As a result, the base current of the transistor Q1 is changed into 0 so that the oscillation of the transistor Q1 is stopped.

When the oscillation of the transistor Q1 is stopped, the divided voltage 19 starts to be reduced with slight delay by the action of the capacitor C5. When the divided voltage 19 starts to be reduced, the current does not flow to the Zener diode D2. Therefore, when a slight time passes after the time T2 (time T3), the transistor Q2 is turned OFF. Accordingly, the voltage of the output 12 starts to be raised with a time constant determined by the values of the resistors R3 to R5 of the filter circuit 9 and the capacity of the capacitor C2 after the time T3. As a result, when the voltage of the output 12 is raised to a level V1 equal to the voltage of the inverted input of the OP amplifier 3 (time T4), the voltage of the voltage control signal 14 starts to be raised. Consequently, a base current flows to the transistor Q1 so that the oscillation of the transistor Q1 is started. Moreover, the oscillation amplitude is more increased when the time passes after the time T4.

As the oscillation amplitude of the transistor Q1 is increased, the divided voltage 19 is raised. Then, the current flows to the Zener diode D2 at a time T5. As a result, the same operation as the operation carried out at the time T2 is restarted. Subsequently, if the secondary output 13 is continuously short-circuited, the same operation is repeated. Consequently, the transistor Q1 carries out the intermittent oscillation so that the heat generation of the transistor Q1 can be prevented from being increased.

Figure 2:
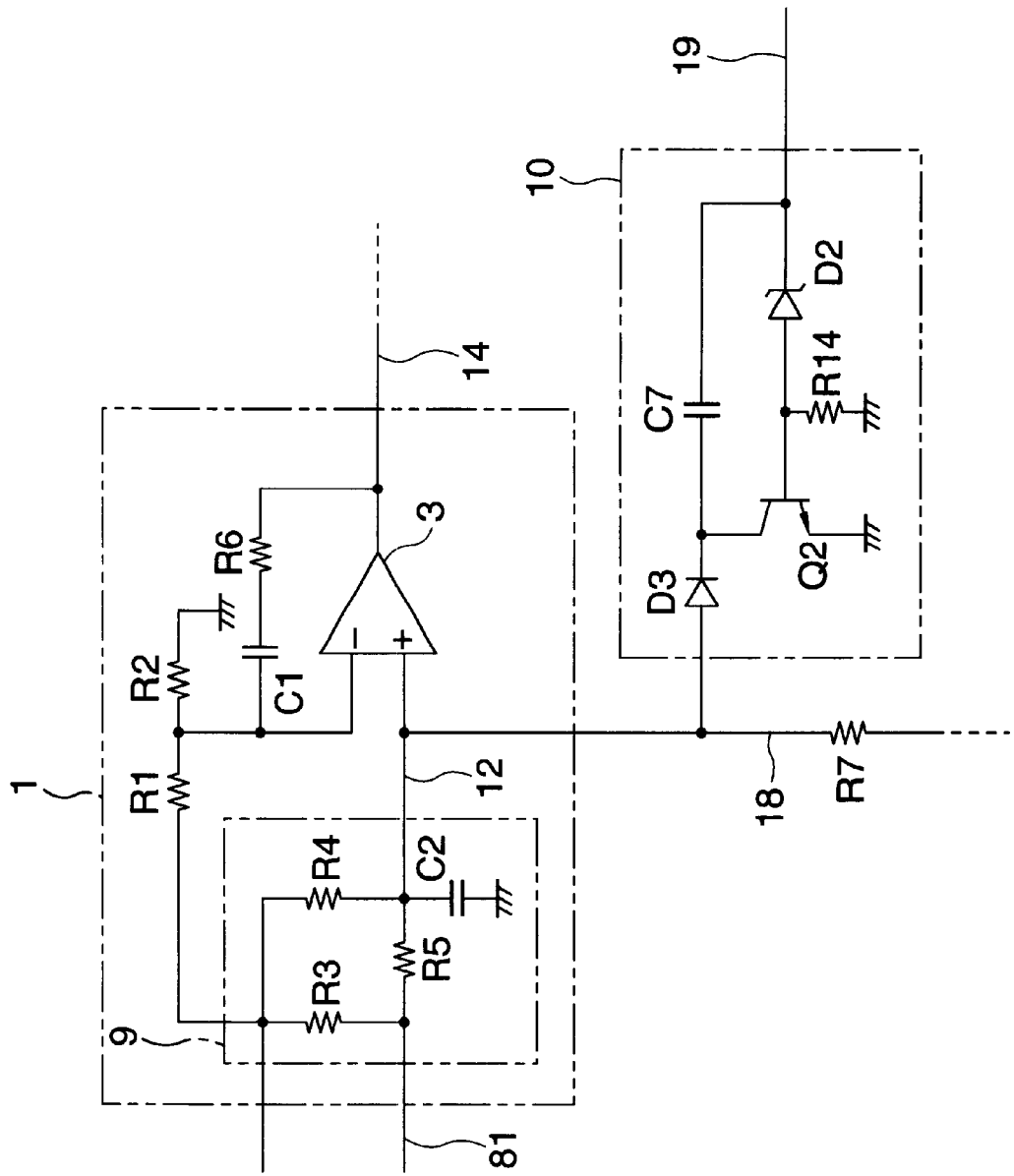
FIGS. 2 is a circuit diagram showing an electrical connection according to a second embodiment.

FIG. 2 is a circuit diagram showing an electrical connection according to a second embodiment. The first and second embodiments have a difference in only an intermittent control circuit. Therefore, FIG. 2 shows only a portion related to the intermittent control circuit (a portion which is not shown has the same structure as that in FIG. 1).

As compared with the intermittent control circuit 2 according to the first embodiment, a diode D3 and a capacitor C7 for delay (which will be hereinafter referred to as a capacitor C7) are added to the intermittent control circuit 10. More specifically, the diode D3 has a cathode connected to the collector of the transistor Q2 and an anode connected to the output 12 of the filter circuit 9 (the non-inverted input of the OP amplifier 3). Moreover, the capacitor C7 has one of terminals connected to the cathode of the diode D3 and the other terminal connected to the divided voltage 19.

In the second embodiment, the structure described above is employed. For this reason, when the secondary output 13 is not short-circuited, the transistor Q2 is turned OFF. At this time, accordingly, the same operation as that in the first embodiment is carried out and detailed description will be therefore omitted.

Figure 6:
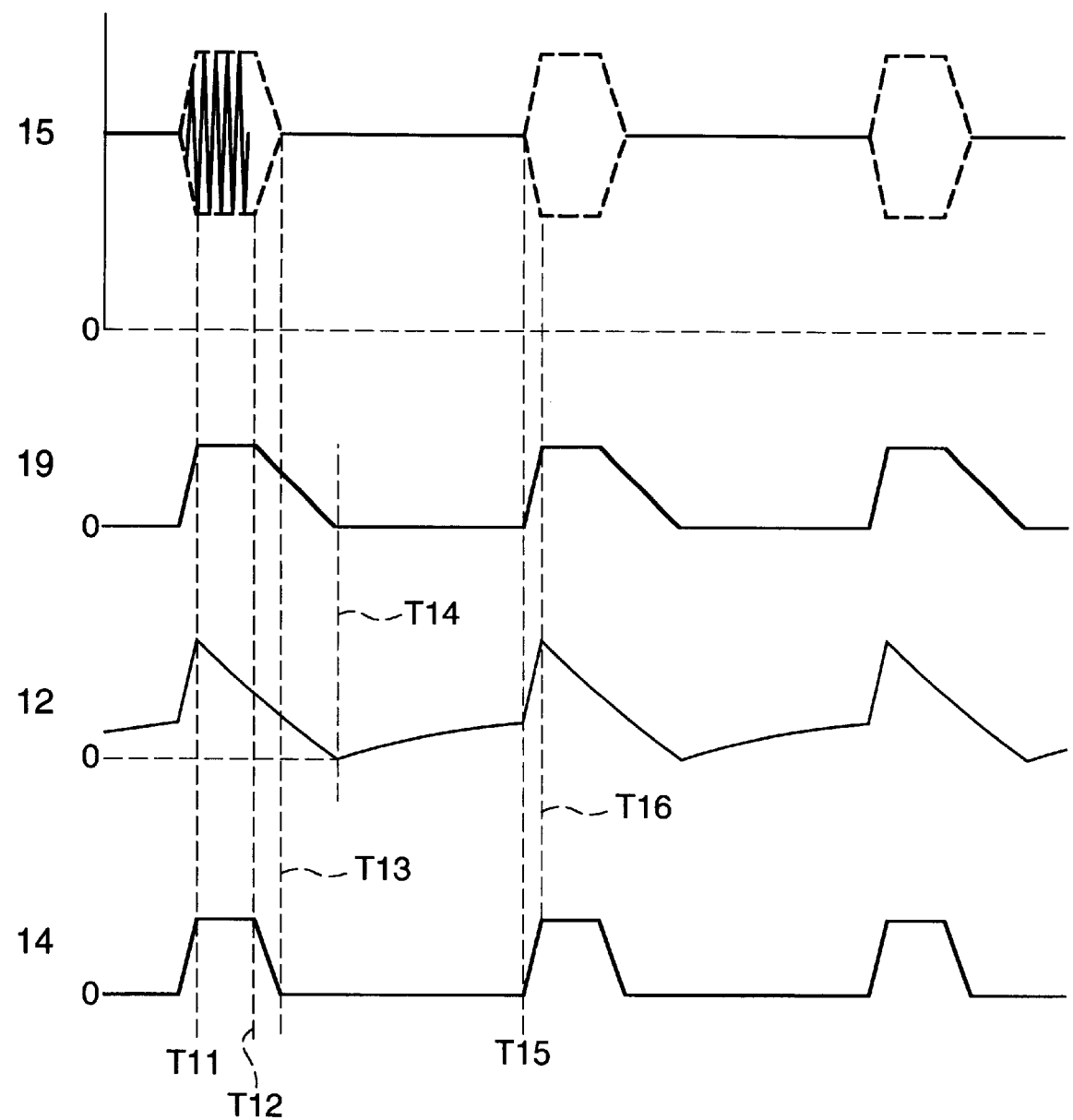
FIG. 6 is a diagram illustrating a waveform of a main signal which is obtained during a short circuit of an output according to a second embodiment.
Figure 7:
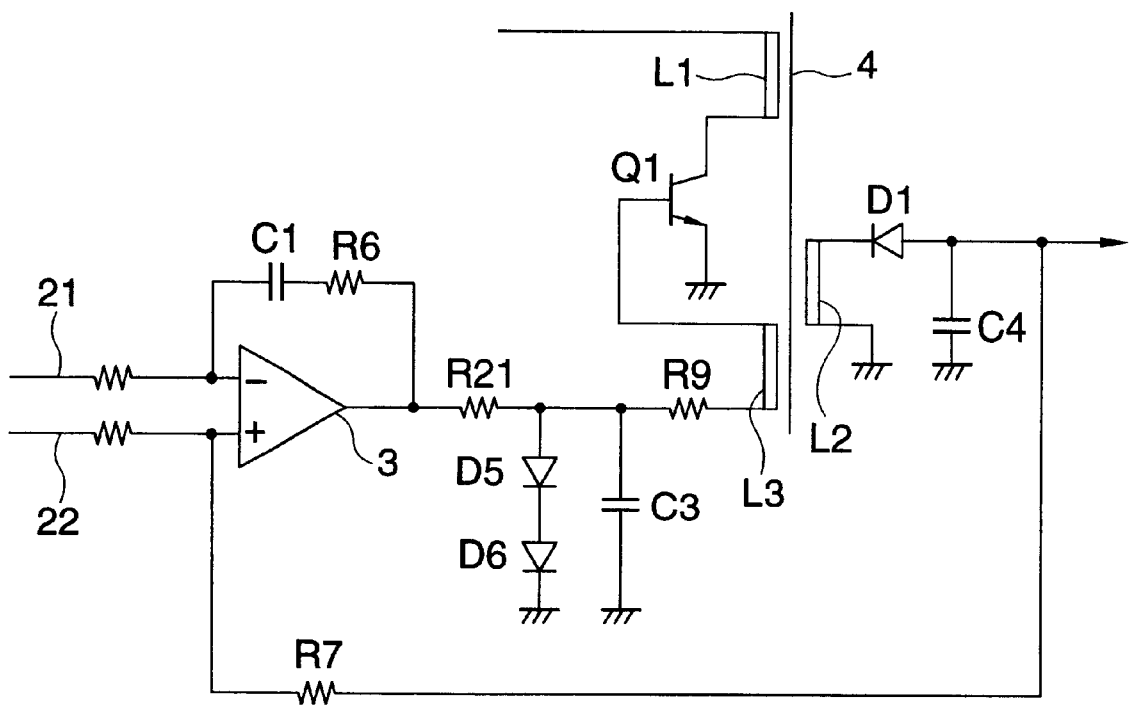
FIG. 7 is a circuit diagram showing an electrical connection according to the conventional art.
Figure 8:
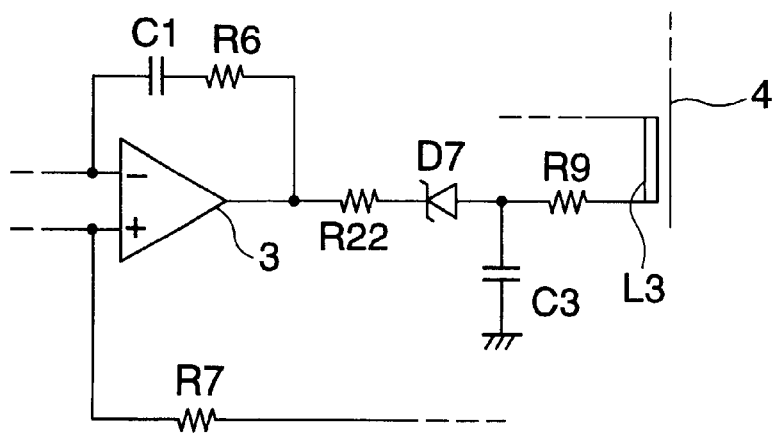
FIG. 8 is a circuit diagram showing the electrical connection according to the conventional art.
Figure 9A:
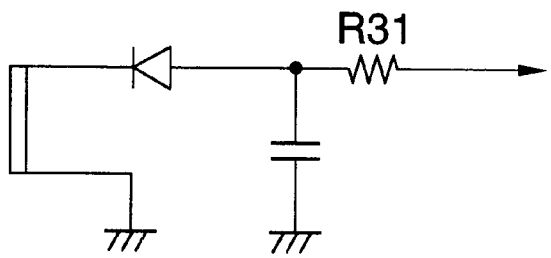
FIG. 9A to 9C are circuit diagrams showing the electrical connection according to the conventional art.
Figure 9B:
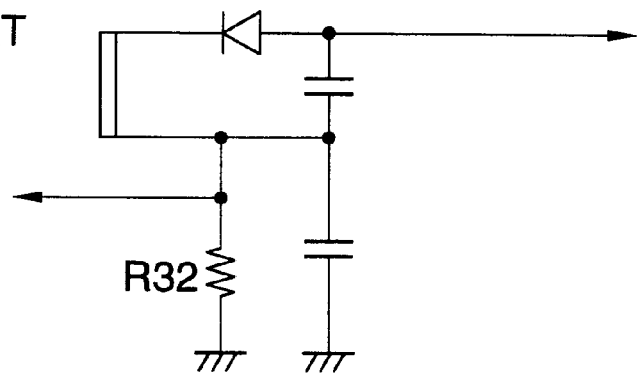
Figure 9C:
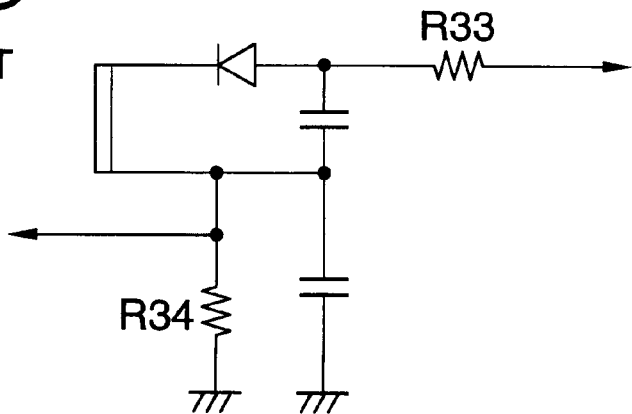

FIG. 6 is a diagram illustrating a waveform of a main signal which is obtained during the intermittent oscillation. An operation to be carried out when the secondary output 13 is short-circuited will be described with reference to FIG. 6 if necessary.

In the state in which the secondary output 13 is short-circuited, when the oscillation amplitude of the transistor Q1 (indicated by 15) is increased and the divided voltage 19 reaches a predetermined voltage (time T11), a current flows to the Zener diode D2 so that the transistor Q2 is being turned ON. On the other hand, when the transistor Q2 is turned ON so that the collector voltage of the transistor Q2 is reduced, the current flows to the capacitor C7 corresponding to the reduction so that a voltage of a path 19 is dropped.

In other words, the capacitor C7 connected between the collector of the transistor Q2 and the path 19 functions to delay a speed at which the transistor Q2 set in the OFF state is being turned ON. As a result, the voltage of the non-inverted input of the OP amplifier 3 is slowly reduced after the time T11 as indicated by 12 of FIG. 6. Accordingly, the voltage of the voltage control signal 14 of the OP amplifier 3 starts to be reduced (as shown by a waveform of 14) when the voltage of the path 12 is dropped to a predetermined level (time T12). As a result, the oscillation amplitude of the transistor Q1 is maintained to be almost constant for a period from the time T11 to the time T12 and is then decreased gradually. At a time T13, the base current of the transistor Q1 is set to 0 so that the transistor Q1 stops the oscillation.

When the oscillation of the transistor Q1 is stopped, the divided voltage 19 starts to be reduced with slight delay. When the divided voltage 19 starts to be reduced, the current does not flow to the Zener diode D2. Therefore, the transistor Q2 is turned OFF (time T14). Accordingly, the capacitor C2 starts to be charged by the resistors R3 to R5 of the filter circuit 9 after the time T14. However, the capacitor C7 is discharged at the time T14. Therefore, when the capacitor C2 is charged, the capacitor C7 is also charged.

After the time T14, accordingly, the voltage of the path 12 starts to be raised with a time constant determined by the values of the resistors R3 to R5 of the filter circuit 9 and a parallel capacity of the capacitor C2 and the capacitor C7. Therefore, the voltage of the path 12 is gently raised. When the voltage of the path 12 is raised to a level equal to the voltage of the inverted input of the OP amplifier 3 (time T15), the voltage of the voltage control signal 14 starts to be raised. Consequently, the base current flows to the transistor Q1 so that the transistor Q1 starts the oscillation. As a result, the divided voltage 19 also starts to be raised.

When the divided voltage 19 is raised, the capacitor C7 having one of terminals to which the divided voltage 19 is applied immediately raises the voltage of the other terminal. At the time T15, accordingly, the capacitor C7 is equivalent to a state in which it is separated from the path 12. After the time T15, therefore, the voltage of the path 12 starts to be raised in accordance with a time constant determined by the values of the resistors R3 to R5 of the filter circuit 9 and only the capacitor C2, that is, a small time constant. Therefore, the voltage of the path 12 is raised rapidly.

The rapid rise in the voltage of the path 12 causes that of the voltage control signal 14. Therefore, the oscillation amplitude of the transistor Q1 is increased rapidly. At a time T16 after the passage of a slight period from the time T15, consequently, a current flows to the Zener diode D2 with the divided voltage 19 thus raised. As a result, the same operation as the operation carried out at the time T11 is restarted after the time T16. Then, in the case in which the secondary output 13 is continuously short-circuited, the same operation is repeated. More specifically, the transistor Q1 carries out the intermittent oscillation. In the intermittent oscillation, moreover, the oscillation is stopped for a long period. Therefore, the heat generation of the transistor Q1 can be more prevented from being increased.

As described above, the capacitor C7 is an element to be equivalently connected in parallel with the capacitor C2 when the transistor Q2 is changed from the ON state to the OFF state. Accordingly, it is possible to set the period for the stop of the oscillation to an optional period by changing the capacity of the capacitor C7.

As described above, a high voltage generating circuit for a toner system printer according to the invention comprises a voltage control circuit for stabilizing a voltage of a secondary output by controlling an oscillation amplitude of a transistor for oscillation in response to a voltage control signal to be sent to an auxiliary coil, the secondary output being led to a high voltage applying portion of a toner system printing section, the high voltage generating circuit further comprising a load suppressing circuit inserted in a current path of a secondary coil and serving to restrict a lower limit of a load impedance of the secondary coil, thereby preventing the oscillation of the transistor for oscillation from being stopped when the secondary output is short-circuited, and an intermittent control circuit for repeating an operation for reducing a voltage of the voltage control signal to stop the oscillation of the transistor for oscillation when detecting a short circuit of a load, and for raising the voltage of the voltage control signal to restart the oscillation of the transistor for oscillation after stopping the oscillation of the transistor for oscillation. Accordingly, also in the case in which the secondary output is short-circuited, the transistor for oscillation carries out the oscillation when the intermittent control circuit is to raise the voltage of the voltage control signal. Moreover, when the intermittent control circuit is to reduce the voltage of the voltage control signal, the transistor for oscillation stops the oscillation. Consequently, when the secondary output is short-circuited, the transistor for oscillation carries out the intermittent oscillation. Therefore, the heat generation of the transistor for oscillation can be prevented from being increased when the output is short-circuited. Thus, it is possible to prevent the performance of the toner system printing section from being deteriorated by a rise in a temperature.

Furthermore, the load suppressing circuit is a voltage dividing circuit inserted between a ground level side path of a rectifying and smoothing circuit for generating the secondary output having a negative voltage by rectifying and smoothing an output of the secondary coil and a ground level, and the intermittent control circuit detects the short circuit of the secondary output based on a divided voltage sent from the voltage dividing circuit. Accordingly, the load suppressing circuit also serves as a circuit for detecting the short circuit of the secondary output. Therefore, when the intermittent oscillation is to be carried out, the number of elements can be prevented from being increased.

Moreover, there is provided a filter circuit including a resistor for a filter and a capacitor for a filter and serving to change the PWM signal into a direct current, the voltage control circuit changing a level of the voltage control signal based on a voltage setting signal to be an output of the filter circuit and the voltage detection signal, thereby stabilizing the voltage of the secondary output into a voltage corresponding to the voltage setting signal, wherein the intermittent control circuit is a switch circuit for closing a connection between the output of the filter circuit and the ground level when detecting the short circuit of the secondary output, and a rise in a voltage of the output of the filter circuit which is caused when the connection of the switch circuit is opened is delayed by the capacitor for a filter, thereby delaying the restart of the oscillation in the intermittent oscillation. Accordingly, the capacitor for a filter serves as an element for delaying the restart of intermittence in the intermittent oscillation and an element to be a filter for changing a PWM signal into a direct current. Therefore, it is possible to prevent the number of elements from being increased when carrying out the intermittent oscillation.

Furthermore, the intermittent control circuit includes a diode having an anode connected to the output of the filter circuit and a cathode connected to the switch circuit, and a capacitor for delay which is connected to the cathode of the diode, wherein the capacitor for delay is discharged when the connection of the switch circuit is closed. Accordingly, when the connection of the switch circuit is changed from a closed state to an open state, the capacitor for delay which is set in a discharge state is connected through the diode in parallel with the output of the filter circuit. Moreover, in the case in which the capacitor for delay is not set in the discharge state, the capacitor for delay is separated from the output of the filter circuit by the diode. Therefore, it is possible to optionally delay a period required for restarting the oscillation in the intermittent oscillation without increasing the time constant of the circuit for changing the PWM signal into a direct current.

Furthermore, the capacitor for delay is connected between an output point for a divided voltage of the voltage dividing circuit and the cathode of the diode. Accordingly, when the oscillation is restarted so that the divided voltage is raised, the charging of the capacitor for delay is stopped even if the voltage between the terminals of the capacitor for delay is equal. Therefore, the rise in the output voltage of the filter circuit is only delayed by only the capacitor for a filter. Therefore, it is possible to cause the oscillation to sharply rise during the intermittent oscillation without increasing the number of elements.

What is claimed is:

1. A high voltage generating circuit for a toner system printer comprising:
   a transformer having at least a primary coil, a secondary coil and an auxiliary coil wound thereon;
   a transistor for oscillation having a collector connected to the primary coil and a base connected to a first terminal of the auxiliary coil and serving to carry out self-oscillation; and
   a voltage control circuit for sending, to a second terminal of the auxiliary coil, a voltage control signal generated based on a voltage detection signal indicative of a voltage of a secondary output;

wherein said voltage control circuit stabilizes the voltage of the secondary output by controlling an oscillation amplitude of said transistor for oscillation in response to the voltage control signal;

wherein the secondary output is led to a high voltage applying portion of a toner system printing section;

wherein said high voltage generating circuit further comprising: a load suppressing circuit inserted in a current path of the secondary coil and serving to restrict a lower limit of a load impedance of the secondary coil, to prevent the oscillation of the transistor for oscillation from being stopped when the secondary output is short-circuited; and an intermittent control circuit for repeating an operation for reducing a voltage of the voltage control signal to stop the oscillation of the transistor for oscillation when detecting a short circuit of a load, and for raising the voltage of the voltage control signal to restart the oscillation of the transistor for oscillation after stopping the oscillation of the transistor for oscillation.

2. The high voltage generating circuit for a toner system printer according to claim 1, wherein said load suppressing circuit is a voltage dividing circuit inserted between a ground level side path of a rectifying and smoothing circuit for generating the secondary output having a negative voltage by rectifying and smoothing an output of the secondary coil and a ground level; and wherein said intermittent control circuit detects the short circuit of the secondary output based on a divided voltage sent from the voltage dividing circuit.

3. The high voltage generating circuit for a toner system printer according to claim 1 or 2, further comprising:

a filter circuit including a resistor for a filter which has one of terminals connected to a signal source of a PWM signal and a capacitor for a filter which is connected between the other terminal of the resistor for a filter and the ground level and serving to change the PWM signal into a direct current;

wherein said voltage control circuit changes a level of the voltage control signal based on a voltage setting signal to be an output of the filter circuit and the voltage detection signal, to stabilize the voltage of the secondary output into a voltage corresponding to the voltage setting signal;

wherein said intermittent control circuit is a switch circuit for closing a connection between the output of the filter circuit and the ground level when detecting the short circuit of the secondary output; and wherein a rise in a voltage of the output of said filter circuit which is caused when the connection of the switch circuit is opened is delayed by the capacitor for a filter, thereby delaying the restart of the oscillation in the intermittent oscillation.

4. The high voltage generating circuit for a toner system printer according to claim 3, wherein said intermittent control circuit includes a diode having an anode connected to the output of the filter circuit and a cathode connected to the switch circuit; and a capacitor for delay which is connected to the cathode of the diode;

wherein the capacitor for delay is discharged when the connection of the switch circuit is closed.

5. The high voltage generating circuit for a toner system printer according to claim 4, wherein said capacitor for delay is connected between an output point for a divided voltage of the voltage dividing circuit and the cathode of the diode.

* * * * *